United States Patent [19]
Nomura et al.

[11] Patent Number: 6,010,656
[45] Date of Patent: Jan. 4, 2000

[54] METHOD OF FORMING A LIGHT-WEIGHT, FIBER-REINFORCED THERMOPLASTIC RESIN PRODUCT AND A LIGHT-WEIGHT MOLDED PRODUCT

[75] Inventors: Manabu Nomura, Ichihara; Yasunobu Yamazaki, Chiba; Tomokazu Abe, Chiba; Kaoru Wada, Chiba; Takayoshi Tanaka, Chiba, all of Japan

[73] Assignee: Idemitsu Petrochemical Co., Ltd., Tokyo, Japan

[21] Appl. No.: 09/125,037

[22] PCT Filed: Feb. 13, 1997

[86] PCT No.: PCT/JP97/00371

§ 371 Date: Aug. 11, 1998

§ 102(e) Date: Aug. 11, 1998

[87] PCT Pub. No.: WO97/29896

PCT Pub. Date: Aug. 21, 1997

[30] Foreign Application Priority Data

Feb. 16, 1996 [JP] Japan .................................. 8-028841
Sep. 30, 1996 [JP] Japan .................................. 8-259349
Oct. 21, 1996 [JP] Japan .................................. 8-277920
Oct. 24, 1996 [JP] Japan .................................. 8-282215

[51] Int. Cl.[7] .......................... B29C 45/00; B29C 45/26; B29K 23/00
[52] U.S. Cl. ..................... 264/255; 264/257; 264/260; 264/313; 264/316; 264/328.8; 264/510
[58] Field of Search ................. 428/318.8; 264/255, 264/257, 260, 313, 316, 328.8, 510

[56] References Cited

U.S. PATENT DOCUMENTS 4,508,774   4/1985   Grabhoefere et al. ................. 428/220

FOREIGN PATENT DOCUMENTS 3-188131   8/1991   Japan .
7-247679   9/1995   Japan .
8-207074   8/1996   Japan .

OTHER PUBLICATIONS

U.S. application No. 09/125,037, filed Aug. 11, 1998, pending.

U.S. application No. 09/199,819, filed Nov. 25, 1998, pending.

*Primary Examiner*—Richard Weisberger
*Attorney, Agent, or Firm*—Oblon, Spivak McClelland, Maier & Neustadt, P.C.

[57] ABSTRACT

The method of forming a light-weight, fiber-reinforced, particularly glass fiber-reinforced-thermoplastic resin product includes the steps of melting and mixing thermoplastic resin pellets containing parallely oriented fibers 2–100 mm long, injecting the melted resin into a cavity which is closed so that its volume is smaller than that of the final molded product, and, before or after the resin injection is completed, opening the cavity until its volume is equal to that of the final molded product. Unlike the conventional injection-molded products, this product does not require a foaming agent and, if it uses any, requires only a small amount of foaming agent. The product thus formed is light in weight and has fibers uniformly entangled inside, providing an excellent appearance of the surface. Further a skin layer is formed over the surface. These features combined with the reinforcement by the glass fibers offer high strength and high stiffness.

8 Claims, 1 Drawing Sheet

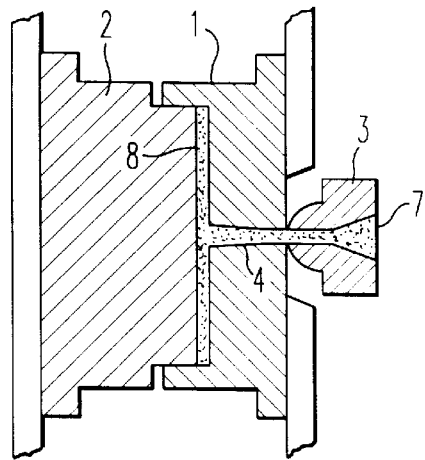
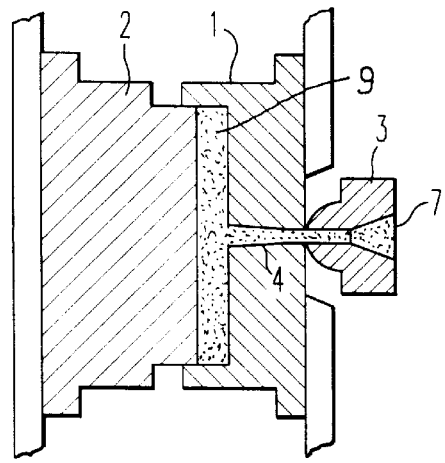
*FIG. 1A*  *FIG. 1B*
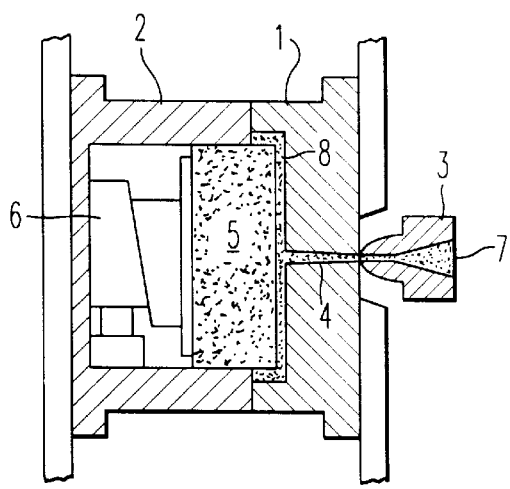
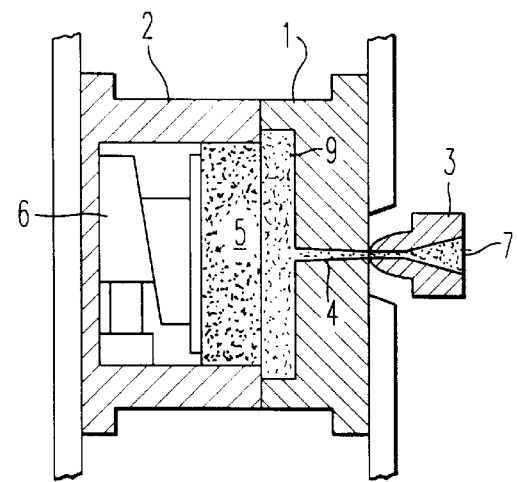
*FIG. 2A*  *FIG. 2B*

METHOD OF FORMING A LIGHT-WEIGHT, FIBER-REINFORCED THERMOPLASTIC RESIN PRODUCT AND A LIGHT-WEIGHT MOLDED PRODUCT

TECHNICAL FIELD

The present invention relates to a method of forming a light-weight, fiber-reinforced thermoplastic resin product, and a light-weight molded product. In particular, the invention relates to a method comprising injection molding of specific fiber-reinforced thermoplastic resin pellets or of specific fiber-reinforced thermoplastic resin pellets and a small amount of a foaming agent for forming a light-weight, fiber-reinforced, particularly glass fiber-reinforced, thermoplastic resin product with good surface condition, high strength and high stiffness, and also to a light-weight molded product.

BACKGROUND ART

As having high tensile strength, high stiffness and high heat resistance, glass fiber-reinforced resins are of great use as various materials. In particular, injection-molded products of resins of the type are the most popular because of their good moldability. However, they are defective in that their specific gravity increases with the increase in the glass fiber content and that their strength is lowered since glass fibers are often cut during molding. In addition, as being anisotropic, they are further defective in that their warping deformation is great. In order to overcome these defects, proposed was a method of using glass fiber-reinforced resin pellets in which the reinforcing glass fibers have the same length as each pellet to be from 2 to 100 mm and are oriented in parallel with each other (see, for example, JP-B Sho-63-37694, JP-A Hei-3-188131). Also proposed was a method of molding fiber-reinforced thermoplastic resin pellets with fibers having a length of from 10 to 100 mm and oriented in parallel with each other, to produce fiber-reinforced thermoplastic resin moldings with fibers entangled and having a length of from 5 to 100 mm (see JP-A Hei-6-198753). However, these methods are still problematic in that the molded products are heavy-weight, depending on the glass fiber content.

On the other hand, to reduce the weight of glass fiber-reinforced resin moldings, known is a foaming injection molding method in which is used a foaming agent (see JP-A Hei-7-247679). However, this method is problematic in that it requires a large amount of a foaming agent, that it is not easy to attain a foaming magnification of from 2 to 5 times, and that the glass fiber content is naturally limited. Also known is an injection-press molding method comprising injecting a foaming agent-containing resin into the cavity of an opened split mold followed by closing the mold. However, this method is still problematic in that, if a large amount of a foaming agent is used in order to obtain foamed moldings having a high foaming magnification, failed moldings having silver marks of vapor paths in their surface are formed, and that most of the moldings produced have poor strength and stiffness. For these reasons, at present, the known methods could not be put into practical use.

Another method of forming fiber-reinforced resin moldings is known, which comprises plasticizing a mixture of reinforcing fibers and a thermoplastic resin followed by molding it under compression, and which is characterized in that the compression for the surface of the molding in which the reinforcing fibers are intended to be restored expanded is partly released thereby raising the fibers existing in the surface layer of the molding, and/or forming voids partly inside the molding to make the molding have a sound-absorbing region (see WO96/25280) However, this molding method is to produce moldings having a specific, raised surface condition, and could not produce moldings with smooth surface. In addition, as comprising the compression molding step, this method is problematic in that its producibility is low, that the raw material mixture could not be highly homogenized, and that, if the mixture is highly homogenized, the reinforcing glass fibers are much broken. For those reasons, the use of the moldings produced by this method is limited.

DISCLOSURE OF THE INVENTION

We, the present inventors have assiduously studied in order to obtain light-weight, high-strength, fiber-reinforced thermoplastic resin products through injection molding, and, as a result, have found that the intended light-weight products are obtained by a combination of a specific molding material and a specific molding mode, and that the products obtained have good appearance with good surface characteristics of smooth skin. On the basis of these findings, we have completed the present invention.

The invention is to provide a light-weight, fiber-reinforced resin product, which has a skin layer with no void in its surface and of which the inside is highly uniform and has fiber-entangled, continuous open voids with no large hollow, and the product has a high relative bending strength. Specifically, the invention provides the following:

(1) A method of forming a light-weight, fiber-reinforced thermoplastic resin product, comprising;

melting and kneading a molding material, which comprises fiber-containing thermoplastic resin pellets (A) having a fiber content of from 20 to 80% by weight, the fibers being oriented in parallel with each other and having a length of from 2 to 100 mm, or comprises a mixture of the fiber-containing thermoplastic resin pellets (A) and a thermoplastic resin except (A), the fiber content of the mixture being from 5 to 80% by weight;

then injecting the melted resin into the cavity of a mold as so closed that the volume of its cavity is smaller than that of the final molded product; and before or after the resin injection is completed, opening the mold until the volume of its cavity is equal to that of the final molded product.

(2) The method of forming a light-weight, fiber-reinforced thermoplastic resin product of (1), wherein the fibers are glass fibers and the fiber content is from 20 to 80% by weight.

(3) The method of forming a light-weight, fiber-reinforced thermoplastic resin product of (1), wherein the fibers are organic fibers and the fiber content is from 5 to 80% by weight.

(4) The method of forming a light-weight, fiber-reinforced thermoplastic resin product of (1), wherein the fibers are carbon fibers and the fiber content is from 5 to 80% by weight.

(5) The method of forming a light-weight, fiber-reinforced thermoplastic resin product of (1), wherein a foaming agent in an amount of from 0.01 to 5 parts by weight, relative to 100 parts by weight of the molding material, is added to the molding material.

(6) The method of forming a light-weight, fiber-reinforced thermoplastic resin product of any one of (1) to (5), wherein the thermoplastic resin is a polyolefin-based resin optionally containing a polyolefin as modified with an unsaturated carboxylic acid or its derivative.

(7) The method of forming a light-weight, fiber-reinforced thermoplastic resin product of (1), wherein, in the step of opening the mold until the volume of its cavity is equal to that of the final molded product before or after the resin injection is completed, the part of the mold cavity except its part for forming the edges of the product is opened.

(8) The method of forming a light-weight, fiber-reinforced thermoplastic resin product of (1), wherein, in the step of injecting the melted resin into the cavity of a mold as so closed that the volume of its cavity is smaller than that of the final molded product followed by the step of opening the mold until the volume of its cavity is equal to that of the final molded product before or after the resin injection is completed, the resin injection is so attained that the volume of the resin injected is smaller than that of the initial mold cavity, then the mobile part of the mold is once pushed toward the injected resin before and after the resin injection is completed to thereby make the cavity completely filled with the injected resin, and thereafter the mold is opened until the volume of the mold cavity is equal to that of the final molded product.

(9) A molded, light-weight, fiber-reinforced thermoplastic resin product having a fiber content of from 20 to 80% by weight and a porosity of from 10 to 80%, and having a skin layer with no void on its surface, the fibers existing in the product having a weight-average fiber length of from 1 to 20 mm.

(10) The molded, light-weight, fiber-reinforced thermoplastic resin product of (9), which has a relative bending strength of not smaller than 80 MPa.

(11) The molded, light-weight, fiber-reinforced thermoplastic resin product of (9) or (10), which is for any of car parts, electric appliances for household use, furniture, and building materials.

BRIEF DESCRIPTION OF DRAWINGS

FIG. 1 is a cross-sectional view schematically illustrating one embodiment of an injection mold being used in forming the light-weight, fiber-reinforced thermoplastic resin product of the invention.

FIG. 2 is a cross-sectional view schematically illustrating another embodiment of an injection mold being used in forming the light-weight, fiber-reinforced thermoplastic resin product of the invention.

In these, (A) indicates the step of injecting a resin into the cavity of the mold, and (B) indicates the condition of a final molded product as formed after opening the mold.

Best Modes of Carrying out the Invention

Now, embodiments of the invention are described below.

The method of forming a light-weight, fiber-reinforced thermoplastic resin product of the invention uses the specific, fiber-containing thermoplastic resin pellets (A) noted above, as one component of the molding material. The thermoplastic resin to be used herein is not specifically defined and may include, for example, polyolefin-based resins, polystyrene-based resins, polyvinyl chloride-based resins, polyamide-based resins, polyester-based resins, polyacetal-based resins, polycarbonate-based resins, polyaromatic ether or thioether-based resins, polyaromatic ester-based resins, polysulfone-based resins, acrylate-based resins, etc.

The polyolefin-based resins include, for example, homopolymers and copolymers of α-olefins, such as ethylene, propylene, butene-1,3-methylbutene-1,3-methylpentene-1, 4-methylpentene-1; and copolymers of such α-olefins with other copolymerizable, unsaturated monomers. As specific examples of the resins, mentioned are polyethylene-based resins such as high-density, middle-density or low-density polyethylene, linear polyethylene, ultra-high molecular polyethylene, ethylene-vinyl acetate copolymer, ethylene-ethyl acrylate copolymer; polypropylene-based resins such as syndiotactic polypropylene, isotactic polypropylene, propylene-ethylene block or random copolymer; poly-4-methylpentene-1, etc.

The styrene-based resins include, for example, homopolymers and copolymers of styrene and α-methylstyrene; and copolymers thereof with other copolymerizable, unsaturated monomers. As specific examples of the resins, mentioned are general polystyrene, impact-resistant polystyrene, heat-resistant polystyrene (α-methylstyrene polymer), syndiotactic polystyrene, acrylonitrile-butadiene-styrene copolymer (ABS), acrylonitrile-styrene copolymer (AS), acrylonitrile-polyethylene chloride-styrene copolymer (ACS), acrylonitrile-ethylene-propylene rubber-styrene copolymer (AES), acrylic rubber-acrylonitrile-styrene copolymer (AAS), etc.

The polyvinyl chloride-based resins include, for example, vinyl chloride homopolymers and copolymers of vinyl chloride with other copolymerizable, unsaturated monomers. As specific examples of the resins, mentioned are vinyl chloride-acrylate copolymer, vinyl chloride-methacrylate copolymer, vinyl chloride-ethylene copolymer, vinyl chloride-propylene copolymer, vinyl chloride-vinyl acetate copolymer, vinyl chloride-vinylidene chloride copolymer, etc. These polyvinyl chloride-based resins may be post-chlorinated to increase their chlorine content, and the thus post-chlorinated resins are also be usable in the invention.

The polyamide-based resins include, for example, polymers as prepared by ring-cleaving polymerization of cyclic aliphatic lactams, such as 6-nylon, 12-nylon; polycondensates of aliphatic diamines and aliphatic dicarboxylic acids, such as 6,6-nylon, 6,10-nylon, 6,12-nylon; polycondensates of m-xylenediamine and adipic acid; polycondensates of aromatic diamines and aliphatic dicarboxylic acids; polycondensates of p-phenylenediamine and terephthalic acid; polycondensates of m-phenylenediamine and isophthalic acid; polycondensates of aromatic diamines and aromatic dicarboxylic acids; polycondensates of amino acids, such as 11-nylon, etc.

The polyester-based resins include, for example, polycondensates of aromatic dicarboxylic acids and alkylene glycols. As specific examples of the resins, mentioned are polyethylene terephthalate, polybutylene terephthalate, etc.

The polyacetal-based resins include, for example, homopolymers, such as polyoxymethylene; and formaldehyde-ethylene oxide copolymers to be obtained from trioxan and ethylene oxide.

The polycarbonate-based resins include, for example, 4,4'-dihydroxy-diarylalkane-based polycarbonates. Preferred are bisphenol A-based polycarbonates to be prepared by phosgenation of reacting bisphenol A with phosgene, or by interesterification of reacting bisphenol A with dicarbonates such as diphenyl carbonate. Also usable are modified bisphenol A-based polycarbonates, of which the bisphenol A moiety is partly substituted with 2,2-bis(4-hydroxy-3,5-dimethylphenyl)propane or 2,2-bis(4-hydroxy-3,5-dibromophenyl)propane; and flame-retardant, bisphenol A-based polycarbonates.

The polyaromatic ether or thioether-based resins have ether or thioether bonds in the molecular chain, and their examples include polyphenylene ether, styrene-grafted polyphenylene ether, polyether-ether-ketone, polyphenylene sulfide, etc.

The polyaromatic ester-based resins include, for example, polyoxybenzoyl to be obtained by polycondensation of p-hydroxybenzoic acid; polyarylates to be obtained by polycondensation of bisphenol A with aromatic dicarboxylic acids such as terephthalic acid and isophthalic acid, etc.

The polysulfone-based resins have sulfone groups in the molecular chain, and their examples include polysulfone to be obtained by polycondensation of bisphenol A with 4,4'-dichlorodiphenylsulfone; polyether-sulfones having phenylene groups as bonded at their p-positions via ether group and sulfone group; polyarylene-sulfones having diphenylene groups and diphenylene-ether groups as alternately bonded via sulfone group, etc.

The acrylate-based resins include, for example, methacrylate polymers and acrylate polymers. As the monomers for those polymers, for example, used are methyl, ethyl, n-propyl, isopropyl and butyl methacrylates and acrylates. In industrial use, typically used are methyl methacrylate resins.

In the invention, the thermoplastic resins mentioned above may be used either singly or as combined. Of the thermoplastic resins mentioned above, preferred are polypropylene-based resins such as polypropylene, random or block copolymers of propylene with other olefins, and their mixtures. Especially preferred are polypropylene-based resins containing acid-modified polyolefin-based resins as modified with unsaturated carboxylic acid or their derivatives.

The polyolefin-based resins for the acid-modified polyolefin-based resins include, for example, polypropylene, polyethylene, ethylene-α-olefin copolymers, propylene-ethylene random-copolymers, propylene-ethylene block-copolymers, ethylene-α-olefin copolymer rubbers, ethylene-α-olefin-non-conjugated diene copolymers (e.g., EPDM), and ethylene-aromatic monovinyl compound-conjugated diene copolymer rubbers. The α-olefins include, for example, propylene, butene-1, pentene-1, hexene-1, and 4-methylpentene-1, and one or more of these are usable either singly or as combined. Of those polyolefin-based resins, preferred are polypropylene-based or polyethylene-based resins containing copolymers, and more preferred are polypropylene-based resins.

As specific examples of the unsaturated carboxylic acids and their derivatives to be used for modifying the resins, mentioned are unsaturated carboxylic acids such as acrylic acid, methacrylic acid, maleic acid, fumaric acid, itaconic acid, crotonic acid, citraconic acid, sorbic acid, mesaconic acid, angelic acid; as well as acid anhydrides, esters, amides, imides and metal salts, such as maleic anhydride, itaconic anhydride, citraconic anhydride, methyl acrylate, methyl methacrylate, ethyl acrylate, butyl acrylate, monoethyl acrylate, acrylamide, maleic acid monoamide, maleimide, N-butylmaleimide, sodium acrylate, sodium methacrylate. Of those, preferred are unsaturated dicarboxylic acids and their derivatives; and more preferred is maleic anhydride.

In modifying the polyolefin-based resins with any of those unsaturated carboxylic acids and their derivatives, one or more of the acids and their derivatives may be used either singly or as combined. The modification method is not specifically defined, but maybe of any known conventional ones. For example, a polyolefin-based resin to be modified is dissolved in a suitable organic solvent, to which is added an unsaturated carboxylic acid or its derivative along with a radical-generating agent, and stirred under heat; or those components are put into an extruder and melted and kneaded therein. In the modified polyolefin-based resins, the amount of the unsaturated carboxylic acid or its derivative added is preferably from 0.01 to 20% by weight, more preferably from 0.1 to 10% by weight. Especially preferred are maleic anhydride-modified, polypropylene-based resins, in which the amount of maleic anhydride added is from 0.1 to 10% by weight.

The fibers to be used in the invention are not specifically defined, but preferred are glass fibers. Apart from glass fibers, also usable are ceramic fibers such as boron fibers, silicon carbide fibers, alumina fibers, silicon nitride fibers, zirconia fibers, calcium silicate fibers, rock wool; inorganic fibers such as magnesium oxide fibers, magnesium oxysulfate fibers, magnesium hydroxide fibers, gypsum fibers; metal fibers such as copper fibers, brass fibers, steel fibers, stainless steel fibers, aluminium fibers, aluminium alloy fibers; organic fibers such as polyethylene fibers, polypropylene fibers, aramide fibers, polyarylate fibers; and carbon fibers. Preferred are glass fibers, organic fibers, carbon fibers, and metal fibers; and more preferred are glass fibers, and composite fibers consisting essentially of glass fibers. One or more, same or different types of those fibers are employable herein either singly or as combined.

The glass fibers for use in the invention are preferably surface-treated with coupling agents. The coupling agents may be of any known, conventional, so-called silane or titanium coupling agents. As specific examples of the silane coupling agents, mentioned are
triethoxysilane, vinyltris(β-methoxyethoxy)silane,
γ-methacryloxypropyltrimethoxysilane,
γglycidoxypropyltrimethoxysilane,
β-(1,1-epoxycyclohexyl)ethyltrimethoxysilane,
N-β-(aminoethyl)-γ-aminopropyltrimethoxysilane,
N-β-(aminoethyl)-γ-aminopropylmethyldimethoxysilane,
γ-aminopropyltriethoxysilane,
N-phenyl-γ-aminopropyltrimethoxysilane,
γ-mercaptopropyltrimethoxysilane,
γ-chloropropyltrimethoxysilane,
γ-aminopropyltrimethoxysilane,
γ-aminopropyl-tris(2-methoxy-ethoxy)silane,
N-methyl-γ-aminopropyltrimethoxysilane,
N-vinylbenzyl-γ-aminopropyltriethoxysilane,
triaminopropyltrimethoxysilane,
3-ureidopropyltrimethoxysilane,
3-4,5-dihydroimidazole-propyltriethoxysilane,
hexamethyldisilazane, N,O-(bistrimethylsilyl)amide,
N,N-bis(trimethylsilyl)urea, etc.
Of those, preferred are aminosilanes and epoxysilanes, such as
γ-aminopropyltriethoxysilane,
N-β-(aminoethyl)-γ-aminopropyltrimethoxysilane,
γ-glycidoxypropyltrimethoxysilane,
β-(3,4-epoxycyclohexyl)ethyltrimethoxysilane.
Especially preferred are aminosilanes such as those mentioned above.

As specific examples of the titanium coupling agents, mentioned are
isopropyltriisostearoyl titanate,
isopropyltridodecylbenzenesulfonyl titanate,
isopropyltris(dioctylpyrophosphate) titanate,
tetraisopropylbis(dioctylphosphite) titanate,
tetraoctylbis(ditridecylphosphite) titanate,
tetra(1,1-diallyloxymethyl-1-butyl)bis(ditridecyl)phosphite
    titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate) titanate, isopropyltricumylphenyl titanate, isopropyltri (N-amidoethyl, aminoethyl) titanate, dicumylphenyloxyacetate titanate, diisostearoylethylene titanate, etc.

The surface treatment of glass fibers with those coupling agents may be effected in any ordinary manner, and is not specifically defined. For example, preferred is sizing treatment of applying a sizing agent, which is a solution or suspension of the coupling agent in an organic solvent, to glass fibers, dry mixing or spraying.

The coupling agent may be combined with a film-forming substance for glass. The film-forming substance is not specifically defined, and includes, for example, polyester-based, urethane-based, epoxy-based, acrylic, vinyl acetate-based and isocyanate-based polymers.

In the invention, glass fibers are preferably used as the reinforcing fibers in view of the strength and the modulus (stiffness) of the light-weight molded products, and preferred embodiments of the invention using glass fibers are mentioned hereinunder. Glass fibers of E-glass, S-glass or the like are employable herein, which have a mean fiber diameter of not larger than 20 $\mu$m, preferably from 1 to 17 $\mu$m, more preferably from 3 to 14 $\mu$m. Using too thin glass fibers having a mean fiber diameter of smaller than 1 $\mu$m will make it difficult to wet them with resin or to infiltrate resin into them while producing resin pellets containing them. Too thick glass fibers having a mean fiber diameter of larger than 20 $\mu$m, if used, will be often broken during melting and kneading resin containing them. Along with glass fibers, the thermoplastic resin, especially the polypropylene-based polyolefin resin noted above is drawn and pelletized into pellets having a length of from 2 to 100 mm. In those pellets, the glass fibers may have the same length as each pellet, from 2 to 100 mm. In the invention, used are those glass fiber-reinforced, thermoplastic resin pellets. Preferably, the glass fibers in the resin to be pelletized are bound with a suitable binder into fiber strands each composed of from 100 to 10000 fibers, more preferably from 150 to 5000 fibers.

The binder may be any of urethane-based, olefin-based, acrylic, butadiene-based and epoxy-based ones. Of those, preferred are urethane-based and olefin-based binders. The urethane-based binder generally contains a polyisocyanate, which is obtained through addition polymerization of a diisocyanate compound and a polyalcohol, in an amount of not smaller than 50% by weight, and is grouped into a one-liquid type including oil-modified, moisture-curable and blocking binders, and a two-liquid type including catalyst-curable and polyol-curable binders. Any of those binders is usable in the invention. As the polyolefin-based resin, usable is any of modified polyolefin-based resins as modified with unsaturated carboxylic acids or their derivatives. The thermoplastic resin is infiltrated into those glass fiber strands, and pelletized into the glass fiber-containing thermoplastic resin pellets (A). To apply the resin to the glass fiber strands, for example, employed is a method of dipping the glass fiber strands in a melt of the resin, a method of passing the glass fiber strands through a coating die along with the resin, or a method of extruding a melt of the resin through a die around the glass fiber strands. In order to further improve the infiltration of the resin melt into the fiber strands and improve the wettability of the fiber strands with the resin melt, employed is a drawing method using a die having a roughened surface, in which the fiber strands coated with the resin melt are drawn under tension and then pressed between pressure rolls. The binder is not always necessary so far as the thermoplastic resin is satisfactorily infiltrated into glass fibers and the resulting fiber-containing resin is satisfactorily pelletized. The thus-obtained, long fiber-containing thermoplastic resin strands are cooled, and then cut into pellets having a suitable length. Thus are prepared glass fiber-containing thermoplastic resin pellets (A) in which glass fibers are oriented in parallel with each other while having the same length as each pellet.

The pellets for use in the invention have a length of from 2 to 100 mm, in which the glass fibers have the same length as each pellet, from 2 to 100 mm. Where too short glass fibers having a length of smaller than 2 mm are used in the method of the invention, it is difficult to produce light-weight molded products, and the products produced often have poor mechanical strength and will be much warped and deformed. On the other hand, where too long glass fibers having a length of larger than 100 mm are used, injection molding of the resin containing them is difficult and, in addition, the glass fibers could not be uniformly dispersed in the resin thereby worsening the surface characteristics of the molded products. The length of the resin pellets preferably falls between 3 and 80 mm for obtaining hardly-deformable, light-weight molded products having high mechanical strength and good outward appearance, but more preferably falls between 5 and 50 mm in consideration of the dispersibility of fibers in the resin and the outward appearance and surface characteristics of the molded products to be produced.

The polypropylene-based resin to be formed into pellets preferably has a melt index (MI, at 230° C. and 2.16 kgf) of from 10 to 1000 g/10 min, more preferably from 30 to 600 g/10 min, in view of its infiltrability into fibers and of its moldability. By controlling the polymerization condition, the polypropylene-based resin may have a desired MI; or by adding a peroxide thereto and melting and kneading them, the resin may be controlled to have an increased MI. The pellets are not limited to those prepared by cutting resin strands. Shaped resin sheets, tapes or bands may be cut into pellets in which the fibers may substantially have a length of from 2 to 100 mm.

In the method of forming light-weight resin products of the invention, only the fiber-containing thermoplastic resin pellets (A) may be used; or the pellets (A) may be mixed with any other thermoplastic resins except (A) to give a mixture, and the resin mixture may also be used. In the latter case, the fiber content of the pellets (A) must be from 5 to 80% by weight, preferably from 20 to 80% by weight of the resin mixture. In particular, where glass fibers are used, the fiber content must be from 20 to 80% by weight in order to obtain light-weight molded products. The fiber content may be suitably determined, depending on the type, the density and the length of the fibers used. The thermoplastic resins except (A) may the same as or different from the resins used in preparing (A), and are not specifically defined. As those additional resins, usable are commercially-available, ordinary-grade resin pellets, granules and even powders, and their shape is not specifically defined. However, preferred are pellets. Even when the additional resins are of the same type as the resins of (A), their molecular weight and melt flowability may be different from those of the resins of (A).

In the method of forming light-weight resin products of the invention, the molding material to be used may contain additives of reinforcing agent, filler, antioxidant, antistatic agent, flame retardant, pigment and dispersant, such as talc, mica, calcium carbonate, milled glass fibers, carbon fibers, magnesium sulfate fibers, potassium titanate fibers, titanium oxide fibers, organic fibers, etc.

To produce the glass fiber-reinforced, light-weight resin products of the invention, the molding material comprising the components mentioned hereinabove is molded through injection molding under a specific condition. The glass fibers in the molding material comprising the resin pellets are oriented in parallel to each other in each pellet while having a length of from 2 to 100 mm, preferably from 3 to 80 mm, and the glass fiber content of the molding material is from 20 to 80% by weight, preferably from 30 to 70% by weight. If too short glass fibers having a length of smaller than 2 mm are used, the products produced could not be light-weight. If too long glass fibers having a length of larger than 100 mm are used, the molding material is difficult to feed into the injection-molding machine, and, even if fed into the machine, the material could not be stably plasticized so that uniformly molded products are difficult to obtain. If the fiber content is smaller than 20% by weight, it is often difficult to continuously draw glass filaments in producing long fiber-containing resin pellets and light-weight molded products could not be obtained. If the fiber content is larger than 80% by weight, resin could not be sufficiently infiltrated into the fiber strands so that closed fibers will remain in the molded products. Different types of fiber-containing thermoplastic resin pellets (A) having a different fiber length and a different fiber content may be combined, if desired.

To melt, knead and inject the molding material, for example, employed is any of (1) an injection-molding method comprising putting the molding material into the hot cylinder of an injection-molding machine, heating and melting it and dispersing the fibers in the resulting resin melt therein, and thereafter injecting the resin melt into the top of the machine with a plunger or the like, and shaping it in the cavity of the machine; (2) an injection-molding method comprising putting the molding material into the hot cylinder of an injection-molding machine, then heating and melting it therein, feeding the resulting resin melt into the screw area of the machine with a plunger or the like, then dispersing the fibers in the resin melt therein, and thereafter injecting the resin melt into the cavity of the machine; and (3) an injection-molding method comprising feeding the molding material into the top of an injection-molding machine with a screw having deep grooves and having a small reduction ratio, while the cylinder temperature is kept extremely high with preventing the fibers from being broken, and injecting the resin melt into the cavity of the machine with a plunger or the like. The injection-molding method referred to herein includes ordinary injection-molding methods, compression injection-molding methods and pressing injection-molding methods.

Now, the invention is described more concretely with reference to FIG. 1 and FIG. 2.

In FIG. 1 and FIG. 2, 1 is a fixed mold, 2 is a mobile mold, 3 is an injection nozzle, 4 is a sprue, 5 is a working core, 6 is a forward-and-backward movable unit, 7 is a resin melt, 8 is an initial cavity, and 9 is a final cavity (for final products). In these, (A) indicates the stage of injecting resin, and (B) indicates the final stage of molding.

FIG. 1 shows one embodiment of the method of forming light-weight resin products of the invention. First, as in FIG. 1(A), a melt mixture of a molding material is injected into the cavity 8 of the split mold, which is so closed that the volume of the cavity 8 is smaller than that of the final product. In this step, the resin adjacent to the surface of the mold is cooled to form a surface skin layer, as in ordinary injection molding. Next, before or after the resin injection is completed, the mold is opened until its cavity volume is equal to the volume of the intended final product 9, as in FIG. 1 (B). In this step, the expandable resin melt containing entangled fibers expands to have a volume that is equal to the volume of the final product. Next, this is cooled, and the mobile mold 2 is released to take out the final product. In that manner, obtained is the intended, light-weight resin product.

In the illustrated process, the closed condition of the initial cavity and the opened condition of the final cavity may be suitably determined, depending on the fiber content of the molding material to be used, the length of fibers in the molding material, and the porosity (or specific gravity) of the product to be produced. The timing of opening the mold cavity may be suitably determined, depending on the mold temperature, the thickness of the skin layer formed on the surface of the product, and the thickness of the product.

FIG. 2 shows another embodiment of the method of forming light-weight resin products of the invention.

As in FIG. 2, the molding machine for this embodiment comprises the fixed mold 1, the mobile mold 2, and the working core 5 which is disposed inside the mobile mold 2 in such a manner that it can be moved forward and backward in the same direction as the moving direction of the mobile mold but independently of the movement of the mobile mold. In this, the cavity is formed by the fixed mold, the mobile mold and the working core, and its volume is variable by moving forward or backward the working core. In the final step of the illustrated process, the part of the mold cavity except its part for forming the edges of the final product is opened. In the embodiment of FIG. 2, the working core 5 is moved forward and backward by means of the forward-and-backward movable unit 6 (this is a hydraulic sliding system). Briefly, a resin melt is injected into the closed mold cavity, and, just before the resin injection is completed and the cavity is filled with the resin, or after the resin injection is completed and the edges of the product are formed, the working core is moved backward until the volume of the mold cavity is equal to that of the final product. Alternatively, a smaller amount, relative to the volume of the closed mold cavity, of the resin melt is injected into the closed mold cavity, and, before, simultaneously with or after the completion of the resin injection, the mobile mold or the working core is once moved forward so that the cavity mold is completely filled with the resin, and, while or after the cavity mold is completely filled with the resin, the mobile mold or the working core 5 may be moved backward to thereby make the volume of the cavity core equal to that of the final product. In this process, since the resin injection may be effected at a lower injection pressure, it is possible to prevent the reinforcing fibers, which are often broken or oriented during ordinary injection filling, from being broken or from being unfavorably oriented. In the step of once moving forward the mobile mold or the working core to thereby make the mold cavity completely filled with the resin, the moving distance is preferably from 0.1 to 50 mm. More preferably, the moving distance is from 0.1 to 10 mm to prevent air from being introduced into the surface of the product being formed. The air introduction is unfavorable as forming flow marks on the surface of the product formed, and the products with such flow marks have bad outward appearance. The forward-moving speed may generally fall between 0.5 and 30 mm/sec.

The edges of the final product as produced according to the embodiment of FIG. 2 are the parts of the product except the part thereof to be formed by the backward movement of the working core. In the illustrated embodiment, those edges are formed prior to the backward movement of the working core. In other words, in this, before the working core is moved backward, those edges are already formed. Therefore, those edges of the product being produced are not influenced at all by the backward movement of the working core, and the final product shall have good outward appearance at its edges, and its shape is faithful to the shape of the mold used. The backward moving speed of the working core varies, depending on the resin-containing molding material used and the shape of the final product to be produced, but may be generally from 0.1 to 10 mm/sec. It is not always necessary to make the speed constant. If desired, the speed may be gradually accelerated to be higher than that in the initial stage of the backward movement.

Without stopping the working core being moved backward at the position at which the volume of the opened mold cavity is equal to that of the final product, the working core may be once moved backward to a position at which the volume of the opened mold cavity is larger than that of the final product, and thereafter it is moved forward, with compressing the resin product being produced, to the intended position at which the volume of the opened mold cavity is finally equal to that of the final product. Also in the embodiment of FIG. 1, the same type of the forward-and-backward movable unit 6 as that used in the embodiment of FIG. 2 may be disposed between the mobile mold and the holder for the mobile mold.

In the method of forming light-weight resin products of the invention, a foaming material, a fibrous material such as non-woven fabric, or a skin material such as printing resin film may be previously attached to at least one or all inner surfaces or partly thereto of the mold.

In the method of forming light-weight resin products of the invention, the molding material to be used may additionally contain a foaming agent in an amount of from 0.01 to 5 parts by weight relative to 100 parts by weight of the fiber-containing (e.g., glass fiber-containing) thermoplastic resin pellets (A) or of a mixture of the resin pellets (A) and a thermoplastic resin except (A). Though depending on its fiber content and the product to be formed of it, the molding material not containing a foaming agent may often fail to expand stably when the mobile mold is moved backward to enlarge the mold cavity, as the inner pressure in the thus-opened cavity is reduced, resulting in that the surface of the molded product will often undulate to lose flatness. In such a case, addition of a small amount of a foaming agent to the molding material is effective to solve the problem. The foaming agent in the molding material is decomposed under heat to generate gas, which effectively prevents the inner pressure in the cavity from being reduced. The preferred amount of the foaming agent to be in the molding material varies, depending on the type of the foaming agent, the type and the amount of the resin and the reinforcing fibers constituting the molding material, and the molding temperature, but, in general, may fall between 0.01 to 0.8 parts by weight relative to 100 parts by weight of the molding material when the fiber content of the material is from 30 to 80% by weight, or between 0.05 and 1.5 parts by weight relative to the same when the fiber content of the material is from 20 to 30% by weight, or between 0.1 to 5 parts by weight relative to the same when the fiber content of the material is from 10 to 20% by weight.

The type of the foaming agent to be used is not specifically defined, but must be decomposed under heat to generate gas. Concretely, the foaming agent includes, for example, oxalic acid derivatives, azo compounds, hydrazine derivatives, semicarbazides, azide compounds, nitroso compounds, triazoles, urea and its related compounds, nitrites, hydrides, carbonates, bicarbonates, etc.

If its amount is less than 0.01 parts by weight, the foaming agent could not generate a sufficient amount of gas, resulting in that, when the mobile mold is moved backward to enlarge the mold cavity, the inner pressure in the cavity could not be prevented from being reduced, and, in addition, its ability to assist the expansion of the molding material will be poor. If, however, the amount of the foaming agent added is larger than 5 parts by weight, too much gas will be generated in the mold cavity, often resulting in that the product formed will have too many locally-existing voids, or have large hollows, or have flow marks on its surface, and the mechanical strength of the product will be low.

Of the light-weight, fiber-reinforced resin product of the invention, the fiber content is from 10 to 80% by weight, preferably from 20 to 80% by weight, more preferably from 20 to 70% by weight when the reinforcing fibers are glass fibers. When the reinforcing fibers are organic fibers or carbon fibers, the fiber content is from 5 to 80%, preferably from 10 to 70%. The porosity of the product is from 10 to 80%, preferably from 20 to 70%. If it is smaller than 10% by weight, the product could not be light-weight. If it is larger than 80%, it will be difficult to surely form the skin layer with no void on the surface of the product, and, in addition, the strength of the product will be low. The porosity as referred to herein indicates the ratio of the volume of the product except the solid part of glass fibers and resin to the total volume of the product. In the product, the weight-average fiber length is from 1 to 20 mm, preferably from 1.5 to 15 mm, more preferably from 2.0 to 12 mm. Where the length of the fibers existing in the molded product is smaller than 1 mm, the resin melt to be molded into the product will poorly expand so that the product could hardly have the intended porosity, and, in addition, the strength of the product is poor. Even if the length of the fibers is larger than 20 mm, such will have few influences on the strength of the product. Such long fibers will be rather problematic and impracticable in that the molding condition must be mild, the molding time is prolonged and the producibility is low. The light-weight molded product of the invention has a specific bending strength (bending strength/ specific gravity) of not smaller than 80 MPa, preferably not smaller than 90 MPa, more preferably not smaller than 100 MPa. The formation of the skin layer on the surface of the product and the incorporation of reinforcing glass fibers having a specific length into the product offer such a high specific bending strength of the product.

According to the method of the invention, formed are various light-weight resin products. The shape and the size of the fiber-reinforced, especially, glass fiber-reinforced, light-weight, thermoplastic resin product of the invention are not specifically defined. However, preferred are tabular products, especially those having a thickness of not larger than 30 mm, and three dimensionally-shaped products. Concretely mentioned are car parts (e.g., instrument-panel cores, bumper beams, door steps, roof racks, rear quarter panels, air cleaner cases, sunshades, etc.); various light-weight box-type products that are used in various places requiring high impact resistance and high strength, such as helmet boxes to be mounted on motorcycles; parts of electric appliances for household use; building materials (e.g., concrete panels or frames, cable troughs, wall materials, floor materials, floor materials for unit bathes, water pans, etc.); furniture (e.g., chairs, desks, benches, etc.), etc.

Being different from the conventional injection-molding methods, the method of the invention for forming light-weight, fiber-reinforced, especially glass fiber-, organic fiber- or carbon fiber-reinforced, thermoplastic resin products requires a relatively mild mold-compressing condition, without requiring any specific foaming agent. Even if used, the amount of the foaming agent may be small. The molded products finally obtained according to the method of the invention are light in weight and have fibers uniformly entangled inside, providing good surface appearance. Further, they have a skin layer on their surface. These features combined with the reinforcement with glass fibers offer high strength and high stiffness. In addition, the outward appearance of the edges of the products is good and is faithful to the shape of the mold used.

Now, the invention is described in more detail with reference to the following Examples and Comparative Examples, which, however, are not intended to restrict the scope of the invention.

The glass fiber-containing thermoplastic resin pellets (long fiber-containing pellets) used in Examples and Comparative Examples were produced according to the methods mentioned below.

Production Example 1

Herein used was an extrusion apparatus comprising a die fitted to the extruder at its top and five rods disposed in line in the resin melt zone (this is a modification of the apparatus of FIG. 2 in JP-A No. 183531/1991).

Fiber strands: Glass rovings each comprised of 170 glass fibers of 13 μm in diameter as surface-treated with γ-aminopropyltriethoxysilane and bound with an urethane-based binder.

Pre-heating temperature: 200° C.

Thermoplastic resin: 1.0 wt. % maleic anhydride-containing, modified polypropylene having a melt index (hereinafter referred to as MI) at 230° C. and 2.16 kgf of 60 g/10 min.

Melting temperature: 240° C.

Rods: Five rods each having a size of 6 mm (diameter)×3 mm (length).

Inclined angle: 25 degrees.

Under the condition mentioned above, the glass rovings were fed into the die, while being controlled between tension rolls, and dipped in the resin. After having been cooled, these were cut with a pelletizer. Thus were formed glass fiber-containing resin pellets having a glass fiber content of 41% by weight and having a length of 20 mm. These are hereinafter referred to as long fiber-containing pellets A-1.

Production Example 2

γ-Aminopropyltriethoxysilane-treated, long glass fibers of 10 μm in diameter were passed through a polypropylene-based, aqueous emulsion to thereby make the fibers impregnated with the resin. These were dried to prepare glass rovings having a glass fiber content of 97% by weight. The polypropylene-based, aqueous emulsion used herein was prepared by stirring and emulsifying 80 parts by weight of maleic anhydride-containing polypropylene having a maleic anhydride content of 5% by weight and having a limiting viscosity [η] of 0.20 dl/g, 100 parts by weight of water, 20 parts by weight of a nonionic emulsifier and 10 parts by weight of a neutralizing agent, with heating them up to 150° C. These glass rovings were cut in the same manner as in Production Example 1. Thus were formed glass fiber-containing resin pellets having a glass fiber content of 69% by weight and having a length of 12 mm. These are hereinafter referred to as long fiber-containing pellets A-2.

In the following Examples 1 to 3 and Comparative Examples 1 to 3, the molded products produced and the test pieces cut out of the molded products were evaluated and tested according to the methods mentioned below.

(a) Evaluation of Molded Products:
  Each molded product was checked visually.
(b) Bending Strength, Bending Modulus:
  Each test piece was tested according to JIS K-7203.
  Relative Bending Strength=(bending strength)/(specific gravity)
  Relative Bending Modulus=(bending modulus)/(specific gravity)
(c) Weight-average Fiber Length of Glass Fibers in Molded Products:
  Each molded product was ashed, and the ash sample was photographed with a universal projector at a magnification of 10 times. On the picture image, about 3000 glass fibers were measured with a digitizer, and the average of the data was obtained.
(d) Porosity of Molded Products:
  The porosity of each molded product was calculated from the compositional ratio and the specific gravity of the product.

Example 1

Herein used were the long fiber-containing pellets A-1 as the molding material, and an injection-molding machine (Mitsubishi Heavy Industries' 850-MGW Model equipped with Idemitsu's compression unit). The resin temperature was 280° C., and the mold was to form plates having a size of 400 mm×800 mm×t mm thick. First, the mold was set to have a cavity clearance of 3 mm, and the molding material was injected thereinto in an amount corresponding to the cavity volume of 3 mm in thickness. Next, the mold was opened to have a cavity of 6 mm, corresponding to the thickness of the final product being produced. Next, this was cooled, and released to obtain the intended, light-weight, molded product. The surface of the product was found to have a tight skin layer with no silver marks, and the inside thereof uniformly expanded with no large hollows. The product formed was light in weight and good. The porosity of the product, the weight-average fiber length of the glass fibers existing in the product, and the outward appearance, the specific gravity, the relative bending strength and the relative bending modulus of the product were measured and shown in Table 1.

Example 2

A light-weight molded product was produced in the same manner as in Example 1, except that a dry blend of 80 parts by weight of the long fiber-containing pellets A-2 and 20 parts by weight of polypropylene resin having MI=60 g/10 min was used as the molding material, that the initial cavity clearance was 2.5 mm, that the molding material was injected into the mold in an amount corresponding to the cavity clearance of 2.5 mm in thickness, and that the mold was opened to have a cavity of 7.5 mm, corresponding to the thickness of the final product being produced. The surface of the product was found to have a tight skin layer with no silver marks. The product formed was light in weight and good. The data of the product are shown in Table 1.

Example 3

A light-weight molded product was produced in the same manner as in Example 1, except that a dry blend of 50 parts by weight of the long fiber-containing pellets A-2 and 50 parts by weight of polypropylene resin having MI=30 g/10 min was used as the molding material, that the initial cavity clearance was 3 mm, that the molding material was injected into the mold in an amount corresponding to the cavity clearance of 3 mm in thickness, and that, 2 seconds after the resin injection, the mold was opened to have a cavity of 6.5 mm, corresponding to the thickness of the final product being produced, and then cooled. The surface of the product was found to have a tight skin layer with no silver marks. The product formed was light in weight and good. The data of the product are shown in Table 1.

Comparative Example 1

A molded product was produced in the same manner as in Example 1, except that short glass fiber-reinforced pellets of a resin (MI=10 g/10 min) having a glass fiber content of 40% by weight, in which the weight-average fiber length of the glass fibers was 0.45 mm, were used as the molding material. There formed sink marks on the surface of the product, and the product had no voids inside and was not light in weight. The data of the product are shown in Table 1.

Comparative Example 2

A molded product was produced in the same manner as in Comparative Example 1, except that 4 parts by weight of foaming agent master batch pellets (Eiwa Chemical Industry's Polysuren TS-182, having a foaming agent content of 30% by weight) were added to 100 parts by weight of the short fiber-reinforced pellets. The product had a porosity of 17% and was light in weight. However, it had large hollows inside and had no skin layer on its surface. The product was not good. The data of the product are shown in Table 1.

Comparative Example 3

Herein used was the same molding material as in Example 3, to which, however, added were 5 parts by weight of foaming agent master batch pellets (Eiwa Chemical Industry's Polysuren TS-182, having a foaming agent content of 30% by weight). This molding material was molded in an ordinary injection-molding process, in which the cavity clearance was fixed to be 3 mm in thickness and the molding material was injected thereinto in an amount corresponding to the cavity clearance of 3 mm in thickness. The data of the molded product are shown in Table 1.

Example 4

Herein employed were the molding material, the apparatus, the condition and the process mentioned below.
(1) Molding Material
0.5 parts by weight of foaming agent master batch pellets (Eiwa Chemical Industry's Polysuren EE-206, having a foaming agent content of 20% by weight) were added to 100 parts by weight of the long fiber-containing pellets A-1 produced in Production Example 1.
(2) Mold
Used was a split mold for forming rectangular test plates. Its cavity size is 800 mm (length)×400 mm (width), and the thickness of the cavity is variable. The mobile mold is engaged with a working core at the position of 3 mm from its inner surface, and the working core is movable forward and backward in the same direction as the moving direction of the mobile mold but independently of the movement of the mobile mold. See FIG. 2.
(3) Molding Machine
Used was an injection-molding machine (manufactured by Mitsubishi Heavy Industries—this is equipped with Idemitsu's compression unit for moving the working core forward and backward).
(4) Molding Condition
① Molding temperature (cylinder temperature): 260° C.
② Mold temperature: 50° C.
③ Injection pressure: 80 kg/cm$^2$G
④ Injection rate: 60%
⑤ Resin charging time: 3.2 seconds
⑥ Pressure retained: 30 kg/cm$^2$G
⑦ Retention time: 3.0 seconds
⑧ Cooling time: 120 seconds
(5) Molding Operation
The molding operation is as follows:
① In the injection-molding machine, the mobile mold was moved to the position for ordinary injection molding, and the split mold was closed.
② Next, the working core was moved forward to ensure the clearance of 4 mm between the fixed mold and the working core in the mold cavity, and fixed as it was.
③ The molding material was, after having been melted, injected into the mold through the injection unit, with which the initial mold cavity was completely filled.
④ Immediately after the initial mold cavity was completely filled with the resin melt, the working core was started to be moved backward. The backward-moving speed

TABLE 1

| | Porosity of Molded Product (%) | Weight-average Fiber Length of Fibers in Molded Product (mm) | Evaluation of Molded Product | | | | Specific Gravity | Relative Bending Strength (MPa) | Relative Bending Elasticity (MPa) |
|---|---|---|---|---|---|---|---|---|---|
| | | | Surface Appearance | Skin Layer | Porosity Distribution | Warping and Deformation | | | |
| Example-1 | 50 | 8.2 | good | formed | good | no | 0.61 | 131 | 5870 |
| Example-2 | 67 | 5.1 | good | formed | good | no | 0.47 | 142 | 6080 |
| Example-3 | 54 | 6.7 | good | formed | good | no | 0.77 | 129 | 5420 |
| Comparative Example-1 | 0 | 0.39 | sink marks formed | — | no void formed | much deformed | 1.21 | 62 | 4530 |
| Comparative Example-2 | 17 | 0.41 | silver marks formed | not formed | surface foamed | deformed a little | 1.02 | 34 | 2420 |
| Comparative Example-3 | 23 | 5.5 | silver marks formed | not formed | low porosity | deformed a little | 0.91 | 86 | 4310 | was 0.8 mm/sec, and the backward-moving distance was 8 mm. As a result of this backward movement, the cavity thickness was 12 mm, corresponding to the thickness of the final product being produced, and the backward movement was terminated at this position.

5 After having been cooled for the determined period of time, the mobile mold was moved backward and released to take out the molded product.

(6) Evaluation of Molded Product

①  The surface of the final product was smooth, and the edges thereof were all faithful to the shape of the mold used.

② The thickness of the product was 12 mm, or that is, it was about 3 times the thickness of the resin melt injected into the initial mold cavity.

③ The specific gravity of the product was about 0.4.

Comparative Example 4

The same process as in Example 4 was repeated, except that the working core was initially moved backward to the position for the final product. In this, a controlled amount of the resin melt was injected into the mold cavity to have a thickness of about 12 mm.

(1) Evaluation of Molded Product

① The surface of the final product was smooth, and the edges thereof were all faithful to the shape of the mold used.

② The thickness of the product was 12 mm.

③ The specific gravity of the product was about 1.08. The product was not expanded and was not light in weight.

Example 5

In the following Examples and Comparative Examples, the molded products and the test pieces cut out of them were evaluated and tested according to the methods mentioned below.

[Evaluation of Molded Products, Rectangular Test Plates]

Rectangular test plates having a size of 700 mm×450 mm and a thickness, t mm were tested as follows:

(a) Hot Drooping

With its both major sides being fixed, each test plate was put in an oven at 120° C. for 24 hours, and thereafter taken out and left at 23° C. for 1 hour. The drooping of the plate was measured at the most drooped part.

(b) Warping

The both major sides of each test plate were fixed, and the deformation of the plate in each of the three-dimensional directions based on the fixed sides was measured. Of the data, the largest one indicates the warping of the plate.

(c) Impact Strength

The both major sides of each test plate were fixed, and an iron ball weighing 1 kg was dropped onto the plate with varying the distance between the ball and the plate. The height of the dropping ball by which the plate was broken was measured.

(d) Bending Modulus

The bending modulus of each test plate was measured according to JIS K-7203.

Relative Bending Modulus=(bending modulus)/(specific gravity)

(e) Expanded Condition

Each test plate was cut in the thickness direction, and its section was visually checked.

(f) Porosity

The porosity of each test plate was calculated from the compositional ratio and the specific gravity of the plate.

Example 5-1

With feeding rovings of polyarylate fibers (Kuraray's Vectran, trade name) into the die of an extruder, polypropylene (Idemitsu Petrochemical's J-6083H, trade name, having MI=60) was extruded out through the die, whereby the fiber rovings were impregnated with the resin. The thus resin-impregnated fiber rovings were drawn out, cooled and cut into pellets having a length of 12 mm. The pellets had a fiber content of 42% by weight.

0.3 parts by weight of foaming agent master batch pellets (Eiwa Chemical Industry's Polysuren EV-306G, having a foaming agent content of 30% by weight) were added to 100 parts by weight of these pellets, and molded in an injection-molding machine (Mitsubishi Heavy Industries' 850 MGW Model, equipped with Idemitsu's compression unit). For this, used were a mold for rectangular test plates and a mold for sunshades. The resin temperature was 200° C., and he mold temperature was 80° C. The mold was closed to have an initial cavity clearance of 2 mm, and the resin melt was injected into the cavity in an amount corresponding to the thickness of the cavity clearance of 2 mm. 3 minutes after the completion of the resin injection, the mold was opened to have a cavity of 6 mm, corresponding to the thickness of the final product being produced. After having been cooled, the intended final product having a thickness of 6 mm was obtained. The rectangular plate and the sunshade obtained herein were tested, and the test data are shown in Table 2.

Example 5-2

Pellets were prepared in the same manner as in Example 5-1, except that carbon fibers (Toray's Torayca, trade name) were used in place of polyarylate fibers. The pellets had a fiber content of 37% by weight. The pellets were molded in the same manner as in Example 5-1, except that the mold was closed to have an initial cavity clearance of 3 mm, that the resin melt was injected into the cavity in an amount corresponding to the thickness of the cavity clearance of 3 mm, and that, 1 minute after the completion of the resin injection, the mold was opened to have a cavity of 6 mm, corresponding to the thickness of the final product being produced. After having been cooled, the intended final product having a thickness of 6 mm was obtained. The molded products obtained herein were tested, and the test data are shown in Table 2.

Example 5-3

Molded products were produced in the same manner as in Example 5-2, except that the mold was closed to have an initial cavity clearance of 3 mm, that the resin melt was injected into the cavity in an amount corresponding to the thickness of the cavity clearance of 3 mm, and that, 3 minutes after the completion of the resin injection, the mold was opened to have a cavity of 9 mm, corresponding to the thickness of the final product being produced. After having been cooled, the intended final product having a thickness of 9 mm was obtained. The molded products obtained herein were tested, and the test data are shown in Table 2.

Comparative Example 5-1

Herein used was a double-screw extruder. Polypropylene (Idemitsu Petrochemical's J-6083H, trade name, having MI=60) was fed into the extruder through its hopper, the amount of the resin being 63% by weight. After the resin was melted, chopped strands of 3 mm-long carbon fibers were fed thereinto through its side feeder, the amount of the strands being 37% by weight. The mixture was extruded and pelletized. Without adding a foaming agent thereto, the pellets were molded in the same injection-molding method as in Example 4. The molded products obtained herein were tested, and the test data are shown in Table 2.

Comparative Example 5-2

Molded products were produced in the same injection-molding method as in Example 5, except that a molding material as prepared by adding 2 parts by weight of a foaming agent to 100 parts by weight of the same pellets as in Comparative Example 5-1 was used. The molded products obtained herein were tested, and the test data are shown in Table 2.

TABLE 2

| | Porosity of Molded Product (%) | Hot Drooping Test (mm) | Warping (mm) | Impact Strength (m) | Relative Bending Elasticity (MPa) | Expanded Condition |
|---|---|---|---|---|---|---|
| Example 5-1 | 67 | 0.5 | 0.1 | 2 | 6286 | Open voids and entangled fibers were found everywhere in the section. |
| Example 5-2 | 50 | 0.2 | 0.4 | 2 | 19200 | Open voids and entangled fibers were found everywhere in the section. |
| Example 5-3 | 67 | 0.1 | 0.2 | 2 | 24300 | Open voids and entangled fibers were found everywhere in the section. |
| Comparative Example 5-1 | 0 | 1.2 | 5.3 | 0.8 | 11000 | Not expanded (that is not foamed). |
| Comparative Example 5-2 | 67 | 2.3 | 0.9 | 1.1 | 8430 | Large hollows were found in the core area, but no fibers were therein. |

Example 6

The molded products produced herein and the test pieces cut out of the molded products were evaluated and tested according to the methods mentioned below.

① Bending Strength, Bending Modulus

Each sample was tested according to JIS K-7203.

Relative Bending Strength=(bending strength)/(specific gravity)

Relative Bending Modulus=(bending modulus)/(specific gravity)

② (2 Weight-average Fiber Length of Glass Fibers in Molded Product

Each molded product was ashed, and the ash sample was photographed with a universal projector at a magnification of 10 times. On the picture image, about 3000 glass fibers were measured with a digitizer, and the average of the data was obtained.

(1) Molding Material

Used were the long fiber-containing pellets A-1 as produced in Production Example 1.

(2) Mold

Used was a split mold for forming rectangular test plates. Its cavity size is 800 mm (length)×1400 mm (width), and the thickness of the cavity is variable. The mobile mold is engaged with a working core at the position of 3 mm from its inner surface, and the working core is movable forward and backward in the same direction as the moving direction of the mobile mold but independently of the movement of the mobile mold. See FIG. 2.

(3) Molding Machine

Used was Mitsubishi Heavy Industries' injection-molding machine, 850MGW-160 Model equipped with Idemitsu's compression unit for moving the working core forward and backward.

(4) Molding Condition

① Molding temperature (cylinder temperature): 260° C.
② Mold temperature: 50° C.
③ Injection pressure: 80 kg/cm$^2$G
④ Injection rate: 60%
⑤ Resin charging time: 3.2 seconds
⑥ Pressure retained: 30 kg/cm$^2$G
⑦ A Retention time: 3.0 seconds
⑧ Cooling time: 120 seconds (5) Molding Operation The molding operation is as follows:

① In the injection-molding machine, the mobile mold was moved to the position for ordinary injection molding, and the split mold was closed.

② Next, the working core was moved forward to ensure the clearance of 4 mm between the fixed mold and the working core in the mold cavity, and fixed as it was.

③ The molding material was, after having been melted, injected into the mold through the injection unit, with which the initial mold cavity was completely filled under pressure.

④ Immediately after the retention time, the working core was started to be moved backward. The backward-moving speed was 0.4 mm/sec, and the backward-moving distance was 4 mm. As a result of this backward movement, the cavity thickness was 8 mm, and the backward movement was terminated at this position.

⑤ After having been cooled for the determined period of time, the mobile mold was moved backward and released to take out the molded product. The product was tested, and the test data are shown below.

Porosity of product: 50%

Weight-average fiber length of glass fibers in product: 8.2 mm

Specific gravity: 0.61

Relative bending strength: 131 MPa

Relative bending modulus: 5870 MPa

Expansion of thickness: 2 times

Outward appearance:

The surface of each molded product was smooth. The edges of each molded product were all faithful to the shape of the mold used. However, where the mold of FIG. 1 was used, some edge corners of the product were often chipped off.

Industrial Applicability

According to the present invention, produced are lightweight, fiber-reinforced, for example, glass fiber-reinforced resin products through injection molding with high producibility, substantially without using a foaming agent. Since the molding material to be used in the invention is previously impregnated with resin, it is uniformly melted and kneaded with ease, and the reinforcing fibers are prevented from being broken during kneading operation. The light-weight, molded product of the invention has a good skin layer on its surface, and its inside has many voids owing to the uniformly entangled fibers existing therein. Though being light in weight, the product has high strength, stiffness and hardness, and is widely usable in various fields of cars, furniture and building materials.

We claim:

1. A method of forming a light-weight, fiber-reinforced thermoplastic resin product, comprising;

melting and kneading a molding material, which comprises fiber-containing thermoplastic resin pellets (A) having a fiber content of from 20 to 80% by weight, the fibers being oriented in parallel with each other and having a length of from 2 to 100 mm, or comprises a mixture of the fiber-containing thermoplastic resin pellets (A) and a thermoplastic resin except (A), the fiber content of the mixture being from 5 to 80% by weight;

then injecting the melted resin into the cavity of a mold as so closed that the volume of its cavity is smaller than that of the final molded product; and before or after the resin injection is completed, opening the mold until the volume of its cavity is equal to that of the final molded product.

2. The method of forming a light-weight, fiber-reinforced thermoplastic resin product as claimed in claim 1, wherein the fibers are glass fibers and the fiber content is from 20 to 80% by weight.

3. The method of forming a light-weight, fiber-reinforced thermoplastic resin product as claimed in claim 1, wherein the fibers are organic fibers and the fiber content is from 5 to 80% by weight.

4. The method of forming a light-weight, fiber-reinforced thermoplastic resin product as claimed in claim 1, wherein the fibers are carbon fibers and the fiber content is from 5 to 80% by weight.

5. The method of forming a light-weight, fiber-reinforced thermoplastic resin product as claimed in claim 1, wherein a foaming agent in an amount of from 0.01 to 5 parts by weight, relative to 100 parts by weight of the molding material, is added to the molding material.

6. The method of forming a light-weight, fiber-reinforced thermoplastic resin product as claimed in claim 1, wherein the thermoplastic resin is a polyolefin-based resin optionally containing a polyolefin as modified with an unsaturated carboxylic acid or its derivative.

7. The method of forming a light-weight, fiber-reinforced thermoplastic resin product as claimed in claim 1, wherein, in the step of opening the mold until the volume of its cavity is equal to that of the final molded product before or after the resin injection is completed, the part of the mold cavity except its part for forming the edges of the product is opened.

8. The method of forming a light-weight, fiber-reinforced thermoplastic resin product as claimed in claim 1, wherein, in the step of injecting the melted resin into the cavity of a mold as so closed that the volume of its cavity is smaller than that of the final molded product followed by the step of opening the mold until the volume of its cavity is equal to that of the final molded product before or after the resin injection is completed, the resin injection is so attained that the volume of the resin injected is smaller than that of the initial mold cavity, then the mobile part of the mold is once pushed toward the injected resin before and after the resin injection is completed to thereby make the cavity completely filled with the injected resin, and thereafter the mold is opened until the volume of the mold cavity is equal to that of the final molded product.

* * * * *

UNITED STATES PATENT AND TRADEMARK OFFICE
CERTIFICATE OF CORRECTION

PATENT NO. : 6,010,656

DATED : January 4, 2000

INVENTOR(S): Manabu NOMURA et al

It is certified that an error appears in the above-identified patent and that said Letters Patent is hereby corrected as shown below:

Column 19, line 49, "1400 mm (width)," should read --400 mm (width),--.

Column 20, line 2, "A Retention time:" should read --Retention time:--.

Signed and Sealed this

Tenth Day of April, 2001

Attest:

NICHOLAS P. GODICI

Attesting Officer

Acting Director of the United States Patent and Trademark Office